(12) United States Patent
Kurakata et al.

(10) Patent No.: US 6,829,939 B2
(45) Date of Patent: Dec. 14, 2004

(54) METHOD AND APPARATUS FOR MEASURING SOUND THAT TAKES HEARING CHARACTERISTICS INTO CONSIDERATION

(75) Inventors: Kenji Kurakata, Tsukuba (JP); Yasuo Kuchinomachi, Tsukuba (JP)

(73) Assignees: National Institute of Advanced Industrial Science and Technology, Tokyo (JP); a part interest; Kenji Kurakata, Tsukuba (JP); a part interest ( * ) Notice: Subject to any disclaimer, the term of this patent is extended or adjusted under 35 U.S.C. 154(b) by 0 days.

(21) Appl. No.: 10/110,783

(22) PCT Filed: Mar. 29, 2001

(86) PCT No.: PCT/JP01/02678

§ 371 (c)(1),
(2), (4) Date: Apr. 29, 2002

(87) PCT Pub. No.: WO02/18889

PCT Pub. Date: Mar. 7, 2002

(65) Prior Publication Data

US 2002/0152815 A1 Oct. 24, 2002

(51) Int. Cl.$^7$ .............................................. G01L 21/02
(52) U.S. Cl. ......................... 73/585; 600/559; 381/314; 381/320; 704/205; 704/207; 704/225; 704/268
(58) Field of Search ................... 73/591, 585; 600/559; 381/314, 320, 70, 103; 704/205, 207, 209–211, 225, 268

(56) References Cited

U.S. PATENT DOCUMENTS

| | | | | |
|---|---|---|---|---|
| 4,941,179 A | * | 7/1990 | Bergenstoff et al. | 381/321 |
| 5,305,420 A | * | 4/1994 | Nakamura et al. | 704/271 |
| 5,794,201 A | * | 8/1998 | Nejime et al. | 704/267 |
| 2002/0013698 A1 | * | 1/2002 | Vaudrey et al. | 704/225 |

FOREIGN PATENT DOCUMENTS

| | | | | |
|---|---|---|---|---|
| JP | 06-236198 | | 8/1994 | |
| JP | 07028920 A | * | 1/1995 | ........... G06F/19/00 |
| JP | 10-214023 | | 8/1998 | |
| JP | 10-267743 | | 10/1998 | |
| JP | 11046394 A | * | 2/1999 | ........... H04R/3/04 |
| JP | 2000209698 A | * | 7/2000 | ........... H04R/25/00 |
| WO | 98/23130 | | 5/1998 | |

* cited by examiner

Primary Examiner—Hezron Williams
Assistant Examiner—Rose M. Miller
(74) Attorney, Agent, or Firm—Oblon, Spivak, McClelland, Maier & Neustadt, P.C.

(57) ABSTRACT

Sounds input via a sound input device are corrected in accordance with age-based hearing characteristic data read from a memory or correction values for reference hearing characteristics for individual hearing characteristics-measured by an individual hearing characteristics measurement device, and the sounds corresponding to the hearing characteristics are measured and displayed by the display.

8 Claims, 4 Drawing Sheets

(a)

(b)

METHOD AND APPARATUS FOR MEASURING SOUND THAT TAKES HEARING CHARACTERISTICS INTO CONSIDERATION

TECHNICAL FIELD

This invention relates to a method and apparatus for measuring sound that takes into consideration age-based and individual hearing characteristics.

BACKGROUND ART

Human auditory sensitivity to sound differs according to frequency. Thus, in the measurement of sound, it has been proposed to measure sound pressure level to which is applied a frequency weighting that simulates the hearing characteristics. Starting from the 1930s, what is termed "A-weighting characteristic" frequency correction circuitry has been incorporated into sound level meter standards in America, Germany and other countries, one after another. In Japan, too, current sound evaluation methods prescribe evaluation using "sound level weighted with an A-weighting characteristic frequency correction circuit" (JIS Z8731 "Methods of measurement and description of A-weighted sound pressure level" and ISO 1996/1 "Sound—methods of describing and measuring environmental noise—Part 1: Basic quantities and how to obtain them").

The existing sound-level meter standards, JIS C1502 "Sound-level meters" and JIS C1505 "Precision sound-level meters," stipulate the incorporation of A-weighting characteristic (frequency characteristic of FIG. 3) frequency correction circuitry and the ability to display the measurement values (sound level, dB). Also, in recent years, sound level meters (loudness meters) are being sold in Japan and overseas that not only correct the frequency characteristics, but also provide a more accurate display of the loudness of a sound (loudness), based on the ISO standard "ISO 532, Method B."

FIG. 4 shows an example of an apparatus for measuring sound pressure level predetermined in the Japanese method of evaluating sound. Reference numeral 1 denotes a microphone, 2 a level adjustment circuit, 3 a frequency correction circuit, 4 a squaring circuit, 5 an integration circuit, 6 a leveling circuit, and 7 an indicator. The microphone 1 converts measured sound pressure to an electrical signal, the level adjustment circuit 2 changes the gain of the signal input from the microphone 1, and the frequency correction circuit 3 is a circuit that applies to a measured sound pressure signal P a frequency weighting that simulates the hearing characteristics, as described above, such as for example a circuit that has the A-weighting characteristic of FIG. 3. The squaring circuit 4 squares the A-weighting characteristic-corrected sound pressure PA, and the integration circuit 5 is a circuit for smoothing the squared sound pressure signal $PA^2$. In the leveling circuit 6, the root-mean-square of the sound pressure of the smoothed signal is converted to a logarithmic value (dB value), which is displayed by the indicator 7. Typical evaluation quantities are listed in Table 1 of JIS Z8731. For example, A-weighting characteristic sound pressure level LpA is expressed as 10 $\log_{10} PA^2/P0^2$ (here, for the reference sound pressure P0, 20 $\mu$Pa is used, which is close to the sound pressure of the minimum sound that can be heard by a young person with sound hearing).

The measurement value of a sound subjected to A-weighting characteristic sound pressure level hearing correction or the like, or calculated loudness value, corresponds well to the loudness of a sound actually perceived by a person. However, this is only the case when the subject is a young person with normal hearing. Moreover, when hearing characteristics are altered by hearing impairments or aging, there is never a good correspondence with the audible loudness.

FIG. 5 shows a typical example of aging-based changes in audibility. In FIG. 5, horizontal axis values represent time and vertical axis values represent relative amplitude. The sound of the upper half of FIG. 5(a) is an example of the sound of a large bus with many low-frequency components, corrected using a conventional A-weighting characteristic correction circuit, and the sound of the upper half of FIG. 5(b) is an example of the sound of a sawing machine containing many high-frequency "screaming sound" components, also corrected using a conventional A-weighting characteristic correction circuit. These are simulations of the sounds a young person with sound hearing hears. In contrast, the lower halves of FIGS. 5(a) and 5(b) are simulations of the sounds an aged person hears.

In the case of sounds with many low-frequency components such as the sounds of FIG. 5(a), there is no major difference between what is heard by young people and aged people. However, in the case of sounds with many high-frequency components such as the sounds of FIG. 5(b), there is a major difference between what is heard by young people and aged people. Thus, in accordance with differences in the types of sounds (the frequency components contained therein), there are sounds that aged people hear as small sounds owing to changes in their hearing characteristics and as louder sounds to the same extent as heard by young people (see FIG. 5; the same problem arises with respect to people with impaired hearing).

Warning sounds emitted by equipment, along with spoken announcements in public spaces and other such speech sounds, have to be properly audible to everyone. However, these sounds are not always audible to aged people whose hearing characteristics have changed, or to people with impaired hearing. However, because measurements taken with measuring devices (sound level meters) that use existing A-weighting characteristic correction circuits are based on the hearing characteristics (A-weighting characteristic) of young people, it is impossible to accurately measure such differences in the loudness of sounds as perceived by aged people or people with impaired hearing. There is therefore a limit with respect to an evaluation of the loudness of sounds that takes into consideration the hearing characteristics of people with hearing impairments.

Also, there are of course individual differences in hearing characteristics, but because, as described above, measurements made using existing measuring devices are based on average characteristics of young people with sound hearing, it has not been possible to properly cope with individual differences in hearing characteristics.

An object of this invention is to provide a method and apparatus for measuring sound that takes age-based and individual hearing characteristics into consideration and handles these hearing characteristics.

DISCLOSURE OF THE INVENTION

The present invention provides a method and apparatus for measuring sound corresponding to the hearing characteristics of a predetermined age, comprising reading out from a memory hearing characteristic data by age group, and using the hearing characteristics for the predetermined age to correct input sounds.

Since individual hearing characteristics differ, the present invention also provides a method and apparatus for measuring sound corresponding to individual hearing characteristics, comprising measuring individual hearing characteristics, calculating a correction value for reference hearing characteristics and using the correction value to correct input sounds.

The measurement apparatus of this invention includes one provided with selection means that can freely select hearing characteristic data by age group and individual hearing characteristic data.

As described in the foregoing, this invention measures input sounds that are corrected based on hearing characteristic data by age group or individual hearing characteristic data, thereby making it possible to accurately measure sounds corresponding to these hearing characteristics.

BEST MODE FOR IMPLEMENTING THE INVENTION

Figure 1:
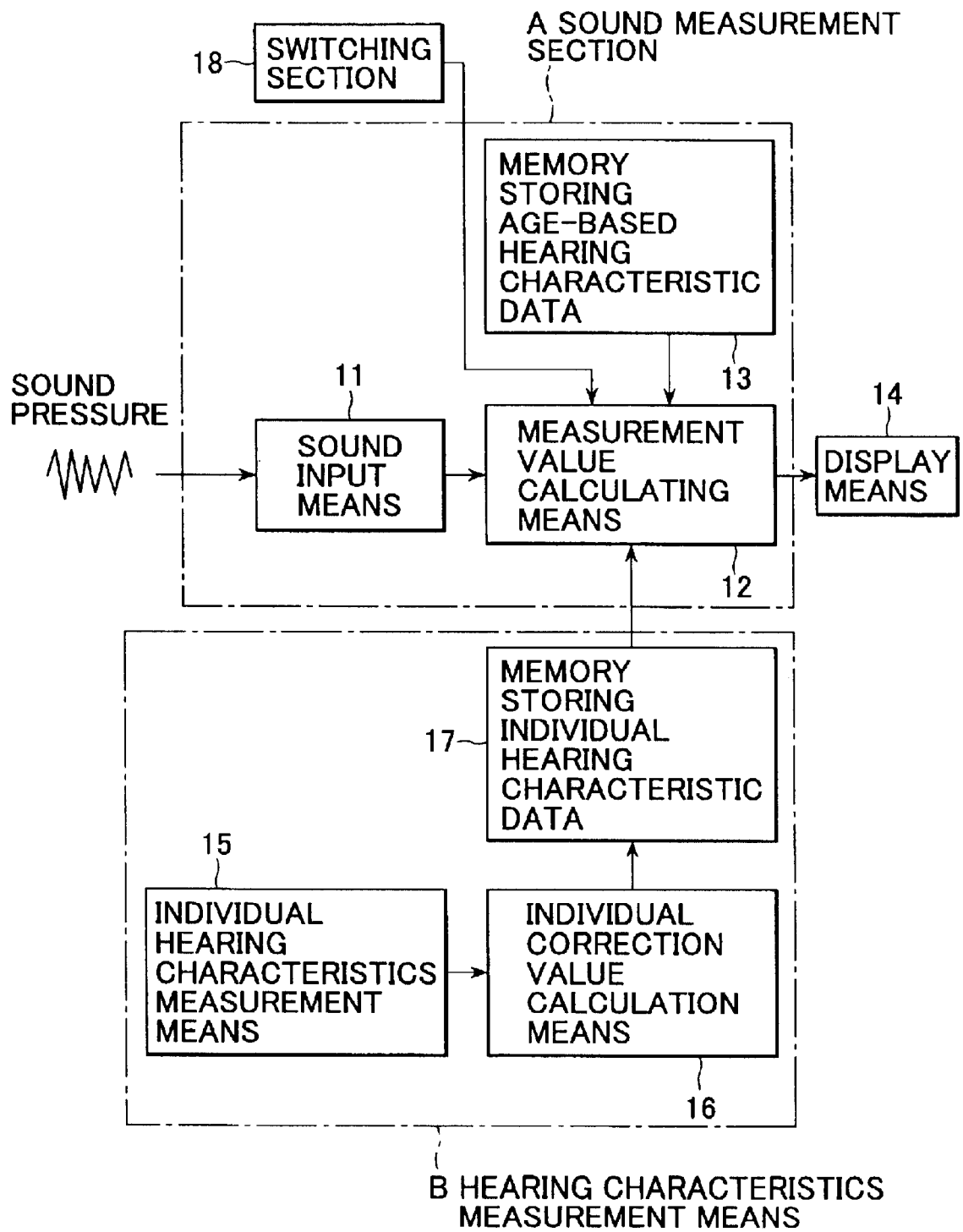
FIG. 1 is a block diagram showing an example of a sound measurement apparatus according to the present invention.

FIG. 1 is a block diagram showing an example of a sound measurement apparatus according to the present invention. A sound measurement section A includes a sound input means 11, a measurement value calculation means 12 and a memory 13 in which are stored age-based hearing characteristic data. The output of the measurement value calculation means 12 is displayed by a display means. A hearing characteristics measurement section B includes an individual hearing characteristics measurement means 15, an individual correction value calculation means 16 and a memory 17 in which are stored individual hearing characteristic data. Reference numeral 18 denotes a data-selection signal-input switching section that selects one of select age-based hearing characteristic data for correction values and calculated individual hearing characteristic data and inputs the selected one to the signal from the sound input means.

The measurement value calculation means 12 weights signals output from the sound input means 11 based on age-based hearing characteristic data stored in the memory 13 or individual hearing characteristic data stored in the memory 17, obtained with the individual correction value calculation means 16, and calculates the measurement value.

(1) Measurements Taking Age-based Hearing Characteristics into Consideration

To respond to normal changes in hearing characteristics that accompany aging, the sound measurement section A is incorporated instead of audibility correction such as A-weighting characteristics and the like. This makes it possible to display the level of sounds subjected to audibility correction by age group. In the case of young people with sound hearing, there is conformity with A-weighting characteristic based audibility correction.

While the sound input means 11 is usually a microphone, it can be a means that suitably reproduces recorded sound signals and inputs the electrical signals, even if the sounds are not directly input by a microphone. Input signals are converted to digital signals by an A/D converter. The following processing is described with reference to the processing of a digitized signal, but in terms of principle, the equivalent processing can also be done using an analogue circuit.

Figure 2:
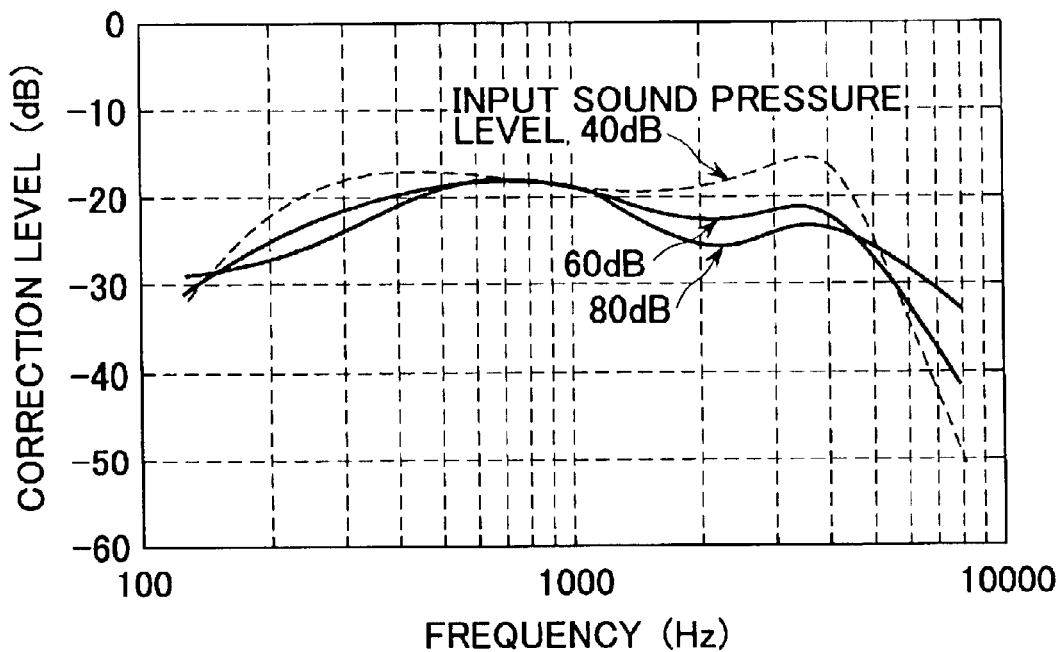
FIG. 2 shows an example of hearing characteristic data by age group (70s), used in the present invention.
Figure 3:
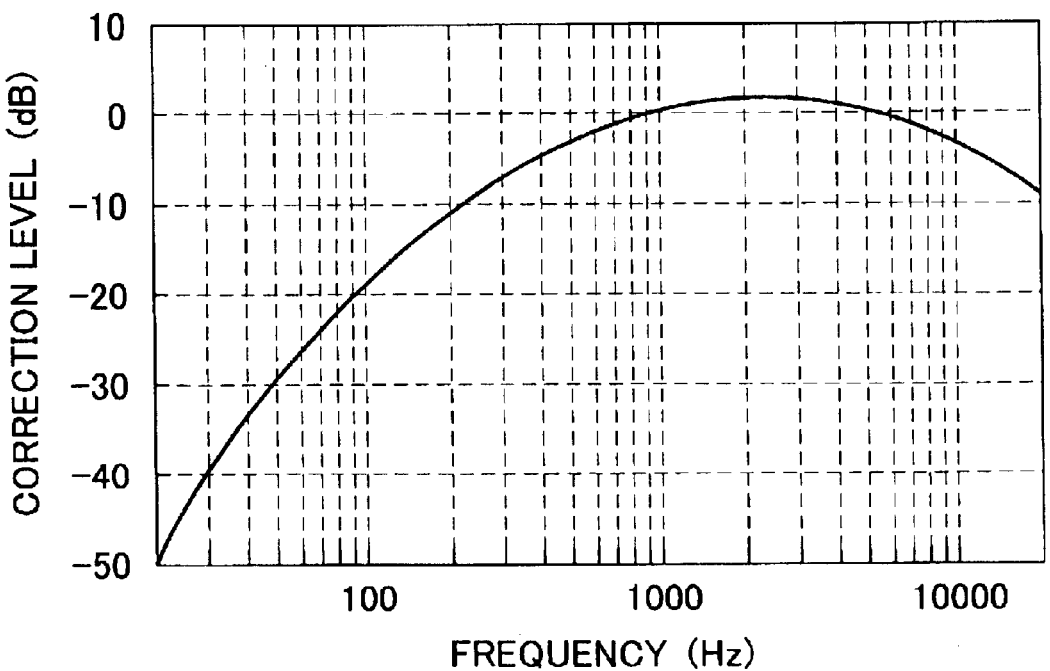
FIG. 3 shows the frequency-weighted characteristics (correction value, A-weighting characteristic) of a sound level meter.
Figure 4:
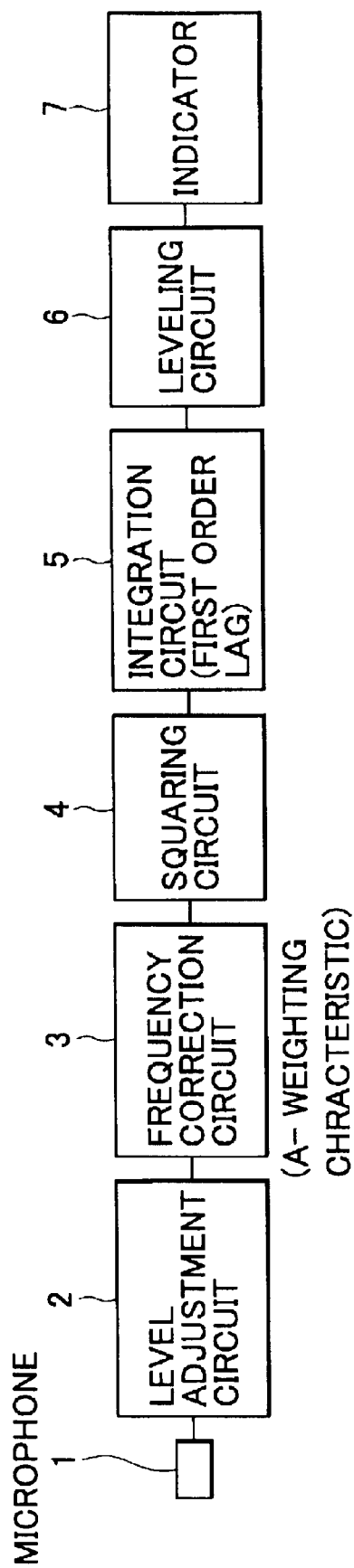
FIG. 4 is a block diagram of a measurement apparatus illustrating a method for measuring sound level.
Figure 5:
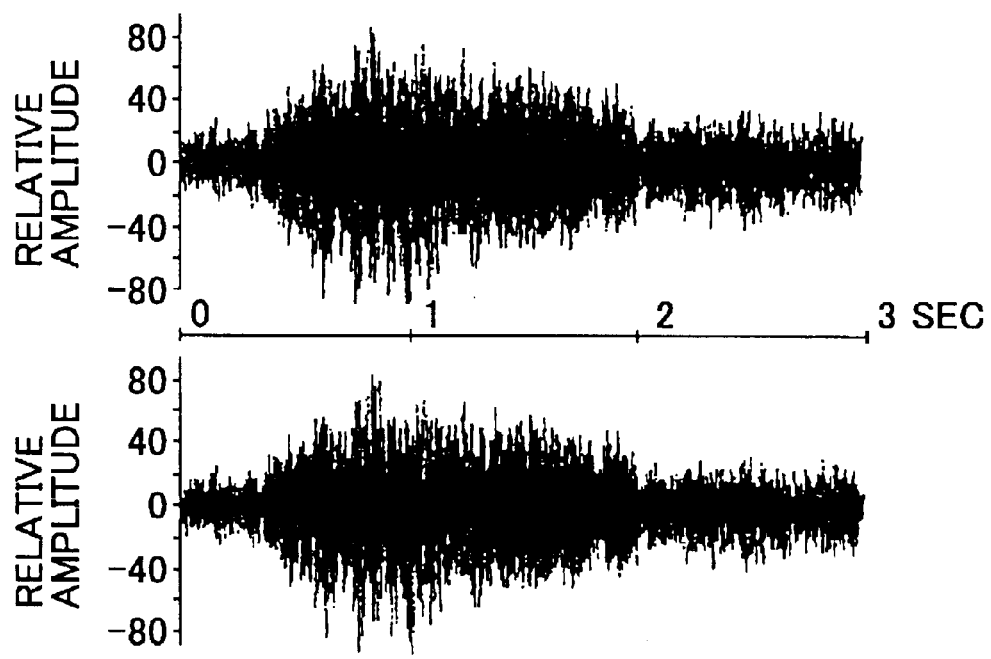
FIG. 5 is for explaining changes in hearing caused by aging, in the case of a large bus with respect to FIG. 5(a), and in the case of a sawing machine with respect to FIG. 5(b).
Figure 5:
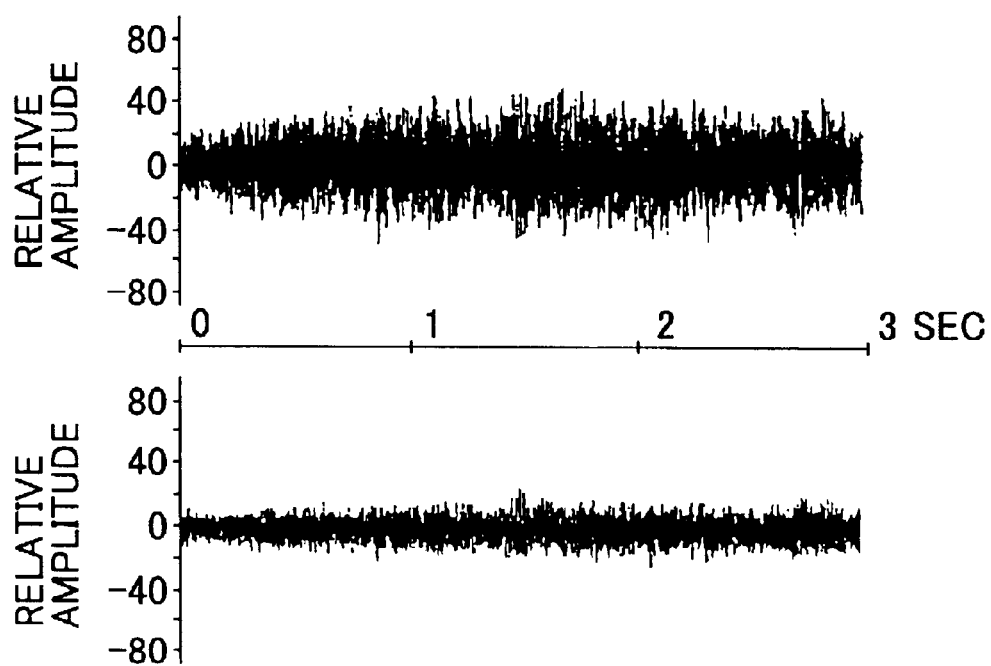

Age-based hearing characteristic data are weighting coefficients (correction values) for each frequency and sound pressure level stored by age group in the memory 13 as measured sound correction values. FIG. 2 shows an example of age-based hearing characteristic data for people in their seventies. In FIG. 2, horizontal axis values represent input sound frequency, vertical axis values represent correction level, and values in the graph represent input sound pressure level. The display means 14 displays measurement results (dB) of calculated sounds with an analogue meter or as a numerical value or the like.

Here, first a sound is input via the sound input means 11 such as a microphone or the like. Input sounds are delivered to the measurement value calculation means 12, which calculates the loudness of the sound. At this time, a sound measurement value that matches the hearing characteristics of the target age is calculated by referring to the age-based hearing characteristic data in the memory 13. The result is output via the display means 14.

If the numerical value (dB) displayed on the display means 14 is, for example, zero or lower, it can be judged as "inaudible." As a result, there is no need for the complex procedure of having a large number of aged people or people with impaired hearing actually listen to the sound to determine whether or not they can hear it.

(2) Measurements Taking Individual Hearing Characteristics into Consideration

To obtain measurement values corresponding to individual hearing characteristics instead of using average data (for example, the correction values of FIG. 2), the hearing characteristics measurement section B is used to measure the hearing characteristics of target individuals. The level of a sound that matches an individual characteristic can be displayed by utilizing the data as a correction characteristic.

Via headphones or the like, sounds having various frequencies and sound pressures are presented to a subject by the individual hearing characteristics measurement means 15. And, a determination is obtained as to whether it can be heard or not, and how loud it is heard. The result of that determination is used as a basis for estimating the subject's hearing characteristics. Based on the individual measurement results of the hearing characteristics measurement means 15, the individual correction value calculation means 16 calculates data corresponding to age-based hearing characteristic data (the characteristics of FIG. 2, for example), and these data are stored in the memory 17.

The data thus measured are processed by the individual correction value calculation means 16, and the individual hearing characteristics data are stored in the memory 17. The switching section 18 switches, whereby in accordance with the selected signal, hearing characteristic data for a specific individual are input to the measurement value calculation means 12. Following that, a measurement value based on that individual's hearing characteristics is calculated and the result is output via the display means 14.

The embodiment of the measurement apparatus shown in FIG. 1 is provided with a sound measurement section A and a hearing characteristics measurement section B, and for the correction value for the object concerned, by using the switching section 18 to select calculated individual hearing characteristic data instead of using age-based hearing characteristic data, it is possible to measure sounds in more detail. Also, the sound measurement section A and hearing characteristics measurement section B can of course be provided as separate apparatuses.

Industrial Applicability (i) It is Possible to Determine Audibility by Hearing-impaired Persons Using the measurement apparatus of the present invention to measure target sounds and voices makes it possible to determine whether or not they are audible to aged people or people with impaired hearing. As a result, there is no need for the complex procedure of having a large number of aged people or people with impaired hearing actually listen to the sounds to determine whether or not they are audible.

With respect also to designing the sound characteristics of warning sounds and announcements, using the measurement apparatus of the present invention to measure those sounds makes it possible to positively confirm whether they are audible to aged people and people with impaired hearing. As a result, it is possible to determine the appropriate audibility at the design stage, before the on-site introduction of the warning sound or announcement equipment, enabling efficient product design.

(ii) It is Possible to Make Measurement of Sound Loudness that Takes into Consideration People with Hearing Impairments Using the measurement apparatus of the present invention to measure traffic noise and other environmental noises, and sounds emitted by industrial products, makes it possible to estimate how loud sounds seem to aged people and people with impaired hearing. As a result, when designing devices and instruments, this clarifies which frequency components should be eliminated to reduce noise, thereby providing efficient noise control guidelines.

(iii) It is Possible to Make Measurement Adapted to Individual Hearing Characteristics Using the "hearing characteristics measurement sections" of the present invention in addition to measurements based on average hearing characteristics of aged people and people with impaired hearing incorporated in the apparatus as "age-based hearing characteristic data" makes it possible, when measuring sounds in spaces utilized by limited persons, such as individual residences, to control sounds and design warning sounds and the like that are more attuned to the hearing characteristics of the user.

We claim:

1. A method of measuring sound that takes hearing characteristics into consideration, comprising:
   inputting sounds via a sound input;
   reading age-based hearing characteristic data from a memory; and
   correcting the input sounds in accordance with hearing characteristic data for a predetermined age as a function of frequency and sound pressure level of the input sounds, thereby measuring sounds corresponding to hearing characteristics of the predetermined age.

2. A method of measuring sound that takes hearing characteristics into consideration to produce calculated values that correspond to perceived loudness of sound, comprising:
   measuring individual hearing characteristics;
   calculating correction values for reference hearing characteristics as a function of frequency and sound pressure level of input sounds; and
   using the correction values to correct sounds input by a sound input, thereby measuring sounds corresponding to the individual hearing characteristics.

3. A sound measurement apparatus that takes hearing characteristics into consideration to produce calculated values that correspond to perceived loudness of sound, comprising:
   a sound input;
   an individual hearing characteristics measurement device;
   an individual correction value calculator that calculates correction values for correcting individual hearing characteristics based on measurement values of the individual hearing characteristics measurement device;
   an individual hearing characteristic data memory in which the correction values are stored;
   a measurement value calculator that corrects sounds measured via the sound input in accordance with individual hearing characteristic data stored in the memory; and
   a display that displays calculated values that correspond to perceived loudness of sound output by the measurement value calculator.

4. A sound measurement apparatus that takes hearing characteristics into consideration to produce calculated values that correspond to perceived loudness of sound, comprising:
   a sound input;
   a memory in which age-based hearing characteristic data are stored;
   a measurement value calculator that corrects sounds input via the sound input in accordance with the age-based hearing characteristic data stored in the memory; and
   a display that displays calculated values that correspond to perceived loudness of output by the measurement value calculator.

5. A sound measurement apparatus that takes hearing characteristics into consideration to produce calculated values that correspond to perceived loudness of sound, comprising:
   means for inputting sound;
   means for reading age-based hearing characteristic data from a memory; and
   means for correcting the input sounds in accordance with hearing characteristic data for a predetermined age as a function of frequency and sound pressure level of the input sounds, thereby measuring sounds corresponding to hearing characteristics of the predetermined age.

6. A sound measurement apparatus that takes hearing characteristics into consideration to produce calculated values that correspond to perceived loudness of sound, comprising:
   means for measuring individual hearing characteristics;
   means for calculating correction values for reference hearing characteristics as a function of frequency and sound pressure level of input sounds; and
   means for using the correction values to correct sounds input by a sound input, thereby measuring sounds corresponding to the individual hearing characteristics.

7. A sound measurement apparatus that takes hearing characteristics into consideration to produce calculated values that correspond to perceived loudness of sound, comprising:
   means for inputting sounds;
   means for measuring individual hearing characteristics;
   means for calculating an individual correction value that calculates correction values for correcting individual hearing characteristics based on measurement values of the individual hearing characteristics measure;

means for storing individual hearing characteristic data;

means for calculating a measurement value in accordance with individual hearing characteristic data stored in the means for storing; and means for displaying calculated values that correspond to perceived loudness of sound output by the means for calculating.

8. A sound measurement apparatus that takes hearing characteristics into consideration to produce calculated values that correspond to perceived loudness of sound, comprising:

means for inputting sound;

means for storing age-based hearing characteristic data;

means for calculating a measurement value in accordance with the age-based hearing characteristic data stored in the means for storing; and means for displaying calculated values that correspond to perceived loudness of output by the means for calculating.

\* \* \* \* \*

UNITED STATES PATENT AND TRADEMARK OFFICE
CERTIFICATE OF CORRECTION

PATENT NO.    : 6,829,939 B2
DATED         : December 14, 2004
INVENTOR(S)   : Kurakata et al.

It is certified that error appears in the above-identified patent and that said Letters Patent is hereby corrected as shown below:

<u>Title page,</u>
Item [30], Foreign Application Priority Data, should read:
-- Aug. 29, 2000  (JP) ………………………………2000-258769 --

Signed and Sealed this

Fourteenth Day of June, 2005

JON W. DUDAS
*Director of the United States Patent and Trademark Office*